United States Patent

Sugimori et al.

[11] Patent Number: 5,136,002
[45] Date of Patent: Aug. 4, 1992

[54] FLUORINE RESIN COMPOSITION

[75] Inventors: Teruhiko Sugimori; Takashi Yamamoto; Tsuruyoshi Matsumoto; Katsuhiko Shimada, all of Otake, Japan

[73] Assignee: Mitsubishi Rayon Company, Ltd., Tokyo, Japan

[21] Appl. No.: 691,722

[22] Filed: Apr. 26, 1991

Related U.S. Application Data

[62] Division of Ser. No. 07/597,873, Oct. 12, 1990, Pat. No. 5,048,924.

[30] Foreign Application Priority Data

Oct. 16, 1989 [JP] Japan ................. 1-266197

[51] Int. Cl.$^5$ ............................................. C08F 16/24
[52] U.S. Cl. .................................................. 526/247
[58] Field of Search ...................................... 526/247

[56] References Cited

U.S. PATENT DOCUMENTS

| | | | |
|---|---|---|---|
| 4,565,855 | 1/1986 | Anderson et al. | 526/247 |
| 4,594,399 | 6/1986 | Anderson et al. | 526/247 |
| 4,654,394 | 3/1987 | Yamabe et al. | 526/247 |
| 4,908,410 | 3/1990 | Malhotra | 526/247 |
| 4,935,477 | 6/1990 | Squire | 526/247 |
| 4,954,588 | 9/1990 | Oka et al. | 526/247 |
| 4,966,435 | 10/1990 | Matsumoto et al. | 526/247 |
| 4,975,505 | 12/1990 | Squire | 526/247 |

FOREIGN PATENT DOCUMENTS

| | | | |
|---|---|---|---|
| 0073087 | 3/1983 | European Pat. Off. | 526/247 |
| 0111343 | 6/1984 | European Pat. Off. | 526/247 |
| 1147501 | 6/1989 | Japan | 526/247 |
| 0019165 | 1/1990 | Japan | 526/247 |
| 922747 | 4/1963 | United Kingdom | 526/247 |
| 8304032 | 11/1983 | World Int. Prop. O. | 526/247 |

Primary Examiner—Joseph L. Schofer
Assistant Examiner—N. Sarofim
Attorney, Agent, or Firm—Oblon, Spivak, McClelland, Maier & Neustadt

[57] ABSTRACT

Disclosed is a resin composition comprising a copolymer [I] having a number average molecular weight of at least 15,000, which comprises at least 30 mole % of the following recurring units [A]:

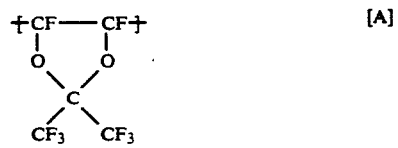

and a compound [II] having a number average molecular weight of at least 1,000, which is comprised of perfluoroalkylether recurring units [D]. This resin composition is used as a cladding of a core-clad optical fiber.

3 Claims, No Drawings

FLUORINE RESIN COMPOSITION

This is a division of application Ser. No. 07/597,873, filed on Oct. 12, 1990, now U.S. Pat. No. 5,048,924.

BACKGROUND OF THE INVENTION

(1) Field of the Invention

The present invention relates to a fluorine resin composition having a high light transmission and excellent heat resistance and solvent resistance, which is suitable as a material for making an optical fiber, an optical lens and a film.

(2) Description of the Related Art

A fluorine polymer generally has an excellent heat resistance, solvent resistance and water resistance, and polytetrafluoroethylene and polyvinylidene fluoride are provided as industrial products and are utilized in various fields.

Nevertheless, these heretofore developed fluorine polymers are crystalline and the light transmission is poor, and therefore, it is difficult to use these polymers as optical materials for which a high light transmission is required.

A perfluoroalkyl methacrylate polymer is known as a fluorine polymer having an excellent light transmission, and although this polymer is used as an optical fiber cladding, since the heat resistance and solvent resistance of this polymer are poor, this polymer is not suitable as a material having an excellent environmental resistance.

Japanese Unexamined Patent Publication No. 63-18964 discloses an amorphous copolymer comprising the following units [A] and [C]:

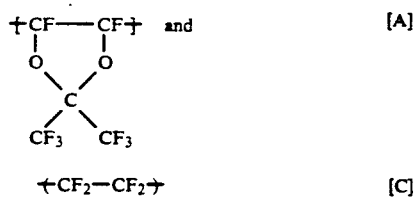

and it is taught that this amorphous copolymer has a high light transmission and an excellent heat resistance and solvent resistance.

U.S. Pat. No. 4,754,009 discloses a copolymer of perfluoro-2,2-dimethyl-1,3-dioxole represented by formula [A] with other polymerizable fluorine-containing monomer [B], and it is taught that the glass transition temperature of the copolymer is not lower than 140° C, and therefore, it is considered that the copolymer has an excellent heat resistance.

Nevertheless, in this copolymer of perfluoro-2,2-dimethyl-1,3-dioxole [A] with other copolymerizable monomer [B], if the copolymerization amount of units [A] is smaller than 30 mole %, the glass transition temperature of the copolymer is lowered and the heat resistance becomes poor, and simultaneously, a partial crystallinity is manifested and the light transmission is lowered.

In the copolymer in which the copolymerization amount of units [A] is larger than 40 mole %, the glass transition temperature is high, and the copolymer is amorphous and has a good light transmission, but since the copolymer has a rigid structure, a film prepared from this copolymer has a low elongation at break and is readily broken.

A copolymer composed of 89 mole % of perfluoro2,2-dimethyl-1,3-dioxole units [A] and 11 mole % of tetrafluoroethylene units [C] has a high heat resistance represented by a glass transition temperature of 250° C., but the elongation at break of the film is as low as 4.3%.

In Japanese Unexamined Patent Publication No. 63-18964, it is taught that the glass transition temperature of a copolymer composed of 56.9 mole % of units [A] and 43.1 mole % of tetrafluoroethylene units [C] is 119° C., but the elongation at break of a film obtained from this copolymer is as low as 4.4%, and that the glass transition temperature of a copolymer composed of 36.6 mole% of units [A] and 63.4 mole % of tetrafluoroethylene units [C] is 90° C. and the elongation at break of a film prepared from this copolymer is as low as 4.1%. On the other hand, the glass transition temperature of a copolymer composed of 22.1 mole % of units [A] and 77.9 mole % of tetrafluoroethylene units [C] is 73° C., but the elongation at break of a film prepared from this copolymer is as high as 58.2%. Further, the heat resistance of the film is not satisfactory.

A copolymer comprising at least 30 mole % of perfluoro-2,2-dimethyl-1,3-dioxole units [A] is an amorphous polymer having a good light transmission and a high heat resistance, but the elongation at break of a film prepared from this copolymer is as low as 7% or lower, and therefore, the handling property of this copolymer is poor and it is difficult to use this copolymer as a film, an optical material or an optical fiber cladding.

SUMMARY OF THE INVENTION

In view of the foregoing, a primary object of the present invention is to provide a perfluoro-2, 2-dimethyl-1,3-dioxole copolymer composition, which is amorphous, has a high heat resistance and a high light transmission, and is capable of giving a film having a high elongation at break.

More specifically, in accordance with the present invention, there is provided a resin composition comprising a copolymer [I] having a number average molecular weight of at least 15,000, preferably at least 20,000, which comprises at least 30 mole % of the following recurring units [A]:

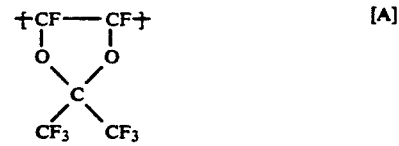

and a compound [II] having a number average molecular weight of at least 1,000, which is comprised of perfluoroalkylether recurring units [D].

DESCRIPTION OF THE PREFERRED EMBODIMENTS

The copolymer comprising recurring units [A] must be an amorphous polymer having a relatively high glass transition temperature and a high light transmission, and to satisfy this requirement, the content of recurring units [A] in the copolymer must be at least 30 mole %, preferably 40 mole % to 90 mole %. The comonomer to be copolymerized with recurring units [A] is not particularly critical, but when a fluorine-containing monomer is used as the comonomer [B], the resulting polymer has a low refractive index and a high water resistance, solvent resistance, and flame retardancy. As specific examples of the comonomer [B], there can be mentioned tetrafluoroethylene, chlorotrifluoroethylene, vinylidene fluoride, hexafluoropropylene, trifluoroethylene, perfluoro(alkyl vinyl ether), fluorovinyl ether, vinyl fluoride and (perfluoroalkyl)ethylene.

The number average molecular weight of the fluorine copolymer [I] must be at least 15,000. The copolymer [I] having a number average molecular weight of at least 30,000 has an excellent shapability, a high heat resistance and a good light transmission, and a shaped article having excellent chemical properties and mechanical properties can be prepared from this copolymer.

The compound [II] comprising recurring units [B], and used in the present invention is an amorphous compound, and the number average molecular weight of this compound must be at least 1,000. A compound [II] having a number average molecular weight lower than 1,000 has a poor compatibility with the copolymer comprising recurring units [A], and a shaped article from a resin composition comprising this compound [II] having too low a number average molecular weight has a problem in that bleeding of the compound [II] to the surface of the shaped article occurs with a lapse of time.

As examples of the recurring units [D], which are perfluoroalkylether, there can be mentioned —$CF_2CF_2O$—,

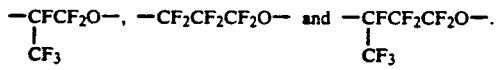

If the polymer [I]/compound [II] mixing ratio is from 99.9/0.1 to 50/50, preferably 99.5/0.5 to 60/40, a film having an elongation at break of at least 20% can be prepared, and the handling property of a shaped article prepared from this polymer composition can be greatly improved.

The resin composition of the present invention is a mixture of a fluorine copolymer and a fluorine compound, which have a very high compatibility therebetween, and the resin composition is characterized in that a shaped article having a high heat resistance, chemical resistance, a high light transmission and a high elongation, i.e., a high toughness, can be obtained.

Especially, the resin composition is characterized in that the refractive index of the copolymer [I] containing recurring units [A] is from 1.29 to 1.34 and the refractive index of the compound [II] comprising recurring units [D] is from 1.29 to 1.31, and that the refractive index of the resin composition of the present invention is from 1.29 to 1.34. Accordingly, the resin composition of the present invention is suitable for the formation of a cladding of an optical fiber and a wave guide.

As the material constituting the core of the optical fiber to be prepared by using the resin composition of the present invention as the cladding, there can be mentioned polymethyl methacrylate, quartz, multi-component glass, polystyrene, polycarbonate, poly-4-methylpentene-1, a fluorinated alkyl methacrylate polymer, a fluorinated alkyl acrylate polymer, a fluorinated alkyl α-fluoroacrylate polymer, a fluorinated styrene polymer, fluorinated polycarbonate and deuterated polymethyl methacrylate. If a material as mentioned above is clad with the resin composition, a bright optical fiber having a large numerical aperture can be provided.

The resin composition of the present invention can be shaped by the coating method, the melt extrusion method or the like and can be utilized in various fields as a coating material, a film, a sheet, a weather-resistant film, a lens, a gas-separating membrane, a gas-concentrating membrane, and the like.

The present invention will now be described in detail with reference to the following examples, that by no means limit the scope of the invention.

EXAMPLE 1

A copolymer [I] composed of 73 mole % of perfluorodimethyl-1,3-dioxole units and 27 mole % of tetrafluoroethylene units and having a refractive index of 1.304, had an intrinsic viscosity [η] of 0.33 as measured at 25° C. by using perfluoro(2-butyltetrahydrofuran), a number average molecular weight of 57,700, and a glass transition temperature of 202° C.

Then, 90 parts by weight of a powder composed of this copolymer and 10 parts by weight of a polyperfluoropropyl ether [II] (Demnum S-200 supplied by Daikin Industries, compound represented by $F+CF_2CF_2CF_2O+_nCF_2CF_3$ refractive index = 1.298; number average molecular weight = 8,400) were mixed together under heating at 150° C. in a mixer provided with high-speed stirring blades, to obtain a homogeneous resin composition having a refractive index of 1.3081.

When the resin composition was allowed to stand in air at 250° C. for 2 hours, the weight loss was only 0.7% by weight, i.e., the volatile loss was very small. A press film obtained by heating the composition at 250° C. was transparent, and the tensile strength, modulus of elasticity and elongation at break of this film, were 300 kg/cm$^2$, 7,200 kg/cm$^2$, and 50%, respectively, and thus it was found that the obtained film had a good toughness. The glass transition temperature was 162° C.

COMPARATIVE EXAMPLE 1

A film was prepared in the same manner as described in Example 1 except that Demnum S-200 was not added. The tensile strength, the modulus of elasticity, and the elongation at break of the obtained film, were 359 kg/cm$^2$, 7,620 kg/cm$^2$, and 4.1%, respectively.

EXAMPLE 2

A resin composition having a refractive index of 1.3122 was prepared in the same manner as described in Example 1 except that the copolymer [I]/compound [II] weight ratio was changed to 67/33. A film prepared from this resin composition in the same manner as described in Example 1 had a tensile strength of 220 kg/cm$^2$, a modulus of elasticity of 5,500 kg/cm$^2$, an elongation at break of 70%, and a glass transition temperature of 103° C. The nitrogen and oxygen permeation coefficients of the film prepared from this resin composition were 7.5×10$^{-8}$.cm$^3$.cm/cm$^2$.sec cmHg and 3.0×10$^{-8}$.cm$^3$.cm/cm$^2$.sec cmHg, respectively.

EXAMPLE 3

A copolymer [I] comprising 60 mole % of perfluoro-2,2-dimethyl-1,3-dioxole units and 40 mole % of tetrafluoroethylene units and having an intrinsic viscosity [η] of 0.47, a number average molecular weight of 104,000, a refractive index of 1.308, and a glass transition temperature of 145° C. was prepared.

Then, 90 parts by weight of a powder of this copolymer [I] and 10 parts by weight of compound [II] (Demnum S-200 supplied by Daikin Industries, the same polyperfluoroalkylether [II] as used in Example 1) were mixed together under heating at 100° C. in a mixer provided with high-speed stirring blades in the same manner as described in Example 1, to obtain a homogeneous resin composition having a refractive index of 1.3124.

When the resin composition was allowed to stand in air at 250° C. for 2 hours, the weight loss was 0.7% by weight, and it was confirmed that the volatile component was low. A press film obtained by heating this resin composition at 210° C. was transparent, and had an elongation at break of 64% and a glass transition temperature of 111° C.

Core-sheath conjugate melt spinning was carried out at 210° C. by using the obtained resin composition as the sheath and polymethyl methacrylate as the core, to obtain an optical fiber having a core diameter of 980 μm and a sheath thickness of 5 μm. The attenuation of the obtained optical fiber was 135 dB/km (650 nm). Even when the optical fiber was wound around a rod having a diameter of 10 mm, no cracks were observed on the surface of the sheath, peeling did not occur at the interface between the core and sheath, and it was confirmed that the optical fiber had excellent mechanical properties.

The refractive index of the polymethyl methacrylate used as the core was 1.49. The numerical aperture of the obtained optical fiber was 0.71, which was much larger than 0.5, i.e., the numerical aperture of the conventional wholly plastic optical fiber.

COMPARATIVE EXAMPLE 2

A press film prepared in the same manner as described in Example 3, except that Demnum S-200 was not added, had an elongation at break of 4.4%. An optical fiber was prepared by using the resin composition of this example in the same manner as described in Example 3. The attenuation of the optical fiber was 135 dB/km (650 nm) and the attenuation characteristics were good. When the optical fiber was wound around a rod having a diameter of 10 mm, however, fine cracks were observed on the surface of the sheath, and it was confirmed that the mechanical properties of the obtained optical fiber were poor.

EXAMPLE 4

A homogeneous resin composition having a refractive index of 1.3126 was prepared by mixing 90 parts by weight of the same copolymer [I] as used in Example 3 and 10 parts by weight of a poly-perfluoroisopropylether represented by the formula of

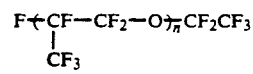

(Krytox 143AD supplied by Du Pont Japan Limited; number average molecular weight=8,250; refractive index=1.301). A film prepared from this resin composition in the same manner as described in Example 1 had an elongation at break of 68% and a glass transition temperature of 102° C.

Core-sheath conjugate spinning was carried out at 250° C. by using this resin composition as the sheath and a polycarbonate having a viscosity average molecular weight of 19,000 and a refractive index of 1.585 as the core, to obtain an optical fiber having a core diameter of 980 μm and a sheath thickness of 10 μm. The attenuation of the obtained optical fiber was 700 dB/km (650 nm) and it was confirmed that the attenuation characteristics of the optical fiber were good. Even when the optical fiber was wound around a rod having a diameter of 10 mm, no cracks were observed on the surface of the sheath and peeling did not occur at the interface between the core and sheath, and thus it was confirmed that the optical fiber had excellent strength characteristics.

We claim:

1. A resin composition comprising a copolymer [I] having a number average molecular weight of at least 15,000, which comprises at least 30 mole % of the following recurring units [A]:

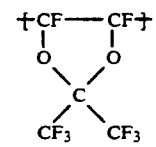

and a compound [II] having a number average molecular weight of at least 1,000, which is comprised of perfluoroalkylether recurring units [D].

2. A resin composition as set forth in claim 1, wherein the refractive index of the resin composition is from 1.29 to 1.34.

3. A resin composition as set forth in claim 1, which is capable of being shaped into a film having an elongation at break of at least 20%.

* * * * *